Feb. 26, 1935.  A. W. GLEASON ET AL  1,992,420

METHOD AND APPARATUS FOR TREATING OILS

Filed June 13, 1932   2 Sheets-Sheet 1

Inventors
Augustus W. Gleason
Donald B. Nutt
By Lyon & Lyon
Attorneys

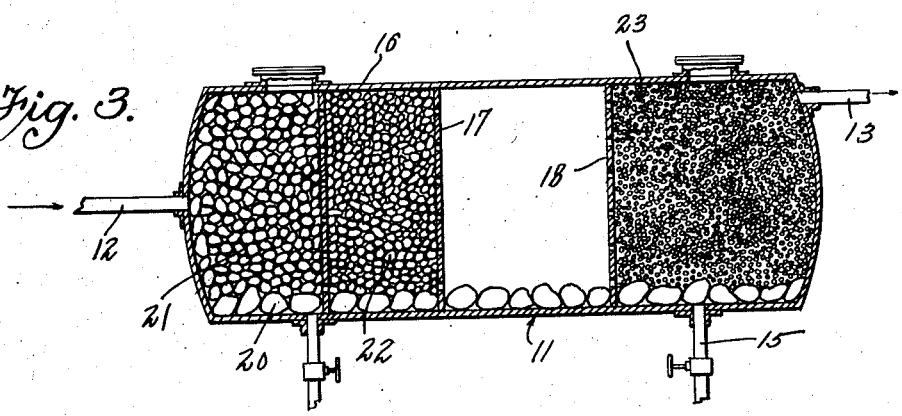
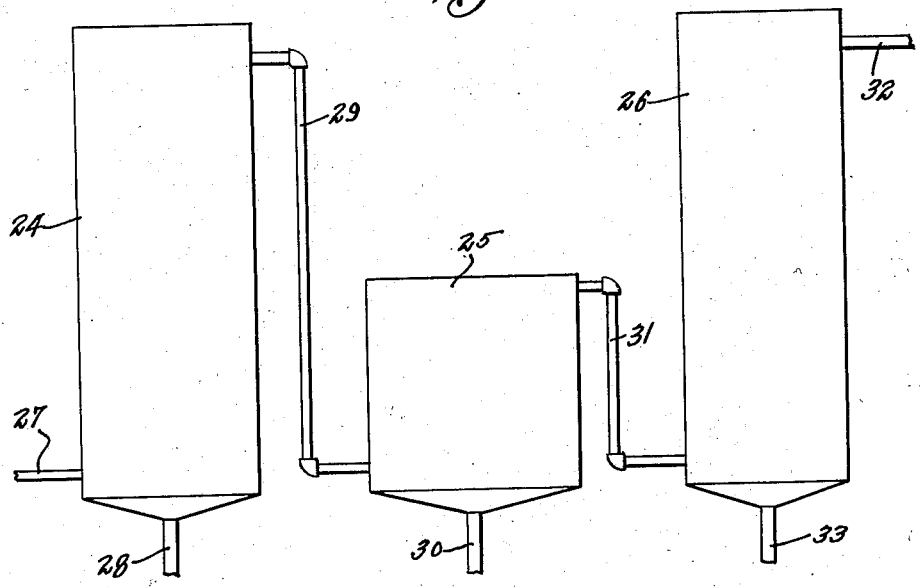

Patented Feb. 26, 1935

1,992,420

UNITED STATES PATENT OFFICE 1,992,420

METHOD AND APPARATUS FOR TREATING OILS

Augustus W. Gleason and Donald B. Nutt, El Segundo, Calif., assignors to Standard Oil Company of California, San Francisco, Calif., a corporation of Delaware Application June 13, 1932, Serial No. 616,798

3 Claims. (Cl. 210—134)

This invention relates to a new method of treating oils, particularly acid treated oils containing sludge or other acid reaction products. The method is particularly applicable to the treatment of petroleum distillates containing finely divided particles of sludge in suspension whereby the sludge is completely removed in a novel manner. The invention also relates to an apparatus by means of which the method may be carried out with great efficiency and rapidity.

In the refining of petroleum oils such as motor fuel, lamp oils or lubricating oils, it is necessary to treat the oil with some agent or agents adapted to remove resinous matter, sulfur compounds, coloring matter and the like. The agent which is ordinarily employed is sulfuric acid. The requisite acid is contacted with the oil, such contact being made in a variety of ways; for example, it may be effected by mechanical agitation or by blowing air through a body of oil and acid.

The action of the acid upon the impurities contained in the oil results in production of a relatively viscous "sludge" which is substantially insoluble in the oil and which is highly acidic. This sludge is distributed throughout the body of oil in the form of drops of varying size. The finished oil must, of course, be neutral and therefore the next step following the contacting of acid with oil is directed toward removing all the suspended sludge from the treated oil. In addition to the acidity of such oil which is due to sludge, there is dissolved in the oil a greater or lesser amount of $SO_2$ and reaction products which contribute to the acidity of the oil and must be removed. Inasmuch as the specific gravity of the sludge is considerably higher than that of the oil, separation of the two fluids by gravity settlement takes place more or less readily upon discontinuance of the agitation. In this way, the greater portion of the acid sludge may be quickly separated and removed without difficulty. It is the almost universal practice at present to follow the acid contacting step with a period of relative quiescence so as to settle out as much sludge as possible.

However, it is virtually impossible to remove all of the slude by gravity settlement due to the fact that the agitation during contact of oil with acid causes the formation of a great number of extremely small particles of sludge which are dispersed throughout the body of the oil and settle very slowly, so slowly in fact, that it is impossible in any commercial operation to allow time for complete clarification.

Both the sludge and the dissolved $SO_2$ may be eliminated by washing the oil with an alkaline solution. However, it would be wasteful to apply a neutralizing agent at once to an oil containing a considerable amount of slude. In general, the practice has been to first settle out and withdraw as much of the sludge as possible and then to wash the oil with water in order to remove most of the remaining small particles of sludge before applying the alkaline wash.

The principal objection to this procedure lies in the fact that the action of water or an aqueous solution upon sludge in the presence of oil causes the re-solution in the oil of part of the coloring matter and other impurities contained in the sludge. The result is apparent at once in a considerable darkening of the color of the oil. This means, of course, that a subsequent decolorizing operation must be resorted to or increased substantially, or that the prior acid treatment must be increased, or that both of these measures must be employed.

Another objection to water washing sludge-containing oil is the highly corrosive action of the weak acid solution thus formed. It is therefore very desirable to find a method for completely removing the fine suspended sludge particles without the use of water or aqueous solutions. It has been proposed to accomplish this by contacting the acid oil with absorbent clay, diatomaceous earth or other porous mineral absorbent material. However, this method is not entirely satisfactory, principally because of the difficulty in disposing of the mixture of absorbent and sludge and also because of the considerable quantity of absorbent required for complete clarification.

In addition to the above method of treating oil for the removal of suspended sludge, attempts have been made to filter the oil so as to remove the suspended sludge particles mechanically. Such filtration has been accomplished by forcing the oil through beds of fine sand or through other pervious bodies such as canvas, clay beds and the like. In these filtering operations, the filter bed or filter cloth is rapidly clogged by the fine drops of rather viscous sludge so that a continuous process cannot be employed. Furthermore, the filtering surfaces must be such that they will not be attacked by the acid sludge. Filtration, therefore, has been abandoned in most cases in view of the fact that it can only be carried on until the voids of the filtering medium are clogged by the sludge when it becomes necessary to shut down and either dispose of the filter bed or restore it for further use by removing the fine sludge. The suggestion has been made to remove sludge from the filter bed by washing it with water and so dissolving and carrying away the sludge. This is successful, to some extent at least, insofar as the sludge removal is concerned, but it leaves the bed permeated with water and hence unsuitable for use before drying. The drying operation (by steam or hot air or the like) is costly and slow. The interruption of the operation to restore the filter bed not only requires labor at frequent intervals, but also results in the loss of good petroleum oil by retention in the filtering medium and necessitates the use of apparatus of large capacity.

In a previous application, Serial No. 299,282, filed by James H. Osmer and Frederick L. Craise, there has been described a method whereby complete sludge removal may be realized in a continuous manner without the disadvantages inherent in the previously proposed processes. According to the method of said application, a porous bed of solid non-absorbent insoluble material capable of being preferentially wetted by the sludge is formed, the pores in such bed being of sufficient size to prevent sludge films formed on the surfaces of the insoluble material from completely filling such pores, and then passing oil containing suspended sludge upwardly through such bed, whereby coalescence of sludge particles takes place upon the surfaces of the bed while at the same time the coalesced sludge drains downwardly from the bed and is thus removed from the oil while the sludge-free oil is discharged from an upper portion of said bed.

The present invention relates to an improvement over the methods and apparatus disclosed by the above mentioned application, Serial No. 299,282.

We have found that when an oil containing suspended sludge, of the character described, is passed upwardly through a bed of rock or equivalent non-absorbent, substantially insoluble and preferably silicious material, the action of the lower part of the bed is to remove relatively large quantities of sludge. For this reason, the lower portions of the bed are generally packed with relatively coarse rock, thus providing large voids which will not be clogged by the quantity of sludge which has to drain downwardly through them. As the oil ascends through the bed, the quantity of sludge carried in suspension decreases. Furthermore, the sludge which is carried by the oil into the upper part of the bed tends to be in a relatively finer state of subdivision and is consequently more difficult to remove. In order to remove this very finely divided sludge, the prior application discloses the use of relatively finely divided rock in the upper portion of the bed. The removal of this finely divided sludge can be obtained by the use of a sufficiently deep bed of rock of a proper degree of subdivision.

The sludge particles which are coalesced in the upper part of the bed, drain downwardly through the entire bed against the concurrent upward flow of oil. There is some tendency for particles of coagulated sludge to be carried upwardly in certain portions of the bed. As a result, although it appears essential to have a relatively deep bed of rock or other equivalent material in order to coalsesce and remove the sludge particles from the oil, in actual practice an appreciable portion of this bed is not being effectively utilized.

We have found that when beds of material capable of exerting a coagulating effect upon sludge, are combined with an intermediate settling zone or settling operation, greatly improved results can be obtained. We have found, for example, that if an oil containing sludge in suspension is first passed through the voids of a bed of material adapted to be wetted by sludge, then into an open or free space wherein the rate of flow is materially less than that in the voids of said bed, and thereafter the oil, and residual sludge particles therein, is caused to pass through another bed of rock, the sludge removal is rendered much more effective.

We account for the improved results obtained by the use of a divided coagulating bed having a free space between the divisions by the fact that the portion of the bed through which the oil first passes accomplishes the agglomeration and removal of most of the larger sludge particles which are readily removed from the oil. In addition, the lower bed effects agglomeration of a number of the small particles into larger, but still small, droplets. These small droplets of sludge are not actually removed by the lower portion of the bed but pass upwardly through the voids. In addition to these agglomerated small droplets, the velocity of the upwardly moving stream of oil may tear off a certain amount of agglomerated sludge from the surface of the particles constituting the bed. After passing through the lower portion of the bed, the oil enters a free or open space, such oil carrying in suspension extremely fine particles of sludge, small agglomerated particles of sludge, and small sludge particles torn off the surfaces of the lower bed. This open unpacked or free zone causes an abrupt decrease in the rate or velocity of flow of the oil, thereby permitting a material quantity of the suspended sludge particles to settle out.

The oil entering the secondary rock bed in the upper portion of the treater therefore contains only the very finely divided sludge particles which could not settle out in the intermediate or free zone of low velocity. In this manner, the upper bed need only exert a coagulating and removing effect upon a relatively small quantity of sludge. Furthermore, as the size of the sludge particles in suspension in the oil falls within rather narrow limits, the upper bed can be particularly designed to remove these specific sludge particles.

The sludge coagulated in the upper bed may be caused to pass through the relatively quiescent body of oil in the settling zone and thus subject it to a scrubbing action, or the sludge coagulated and removed from the oil in the upper or secondary bed of material may be separately withdrawn from the system. Furthermore, when a single treater consisting of a lower bed, an upper bed, and an intermediate open or free zone is used, the top of the lower bed may be provided with a funnel or drip pan adapted to receive the sludge which settles out in such free or open zone. Sludge from this drip pan may be conveyed by suitable means directly to the bottom of the treater or it may be conveyed to some point exteriorly of the treater.

An object of this invention, therefore, is to disclose and provide a process of removing finely divided suspended sludge from petroleum oils in a rapid and continuous manner.

Another object is to disclose and provide a process whereby a substantially complete removal of finely divided acid sludge from petroleum oils may be accomplished by selective coalescing of the sludge on the surface of a solid material, the coalesced sludge being removed in a substantially continuous manner.

A further object is to disclose and provide a method whereby oil containing sludge particles in suspension is sequentially passed through voids in a silicious bed, then through a settling and agglomerating zone at a relatively low velocity, and then through other voids in a secondary bed for the continuous removal of sludge from the oil.

Moreover, an object of the invention is to disclose and provide an apparatus adapted for use in the method of this invention.

These and other objects, uses and advantages of this invention will become apparent to those skilled in the art from the following detailed description of our process and apparatus as applied to the treatment of petroleum distillates such as gasoline and kerosene containing finely divided suspended sludge. The treatment of such distillate is given in detail merely for purposes of illustration, it being understood that the invention is not limited to the treatment of these distillates but is applicable to all oils containing a finely divided sludge or other acid reaction product of greater specific gravity than the oil.

In order to facilitate understanding of this invention, reference will be had to the appended drawings illustrating one form of apparatus adapted to carry out the method of this invention.

In the drawings:

Fig. 3 is a diagrammatic representation of a modified form of apparatus.

Fig. 4 is a diagrammatic representation of still another form of apparatus in which the method of this invention may be practiced.

Figure 1:
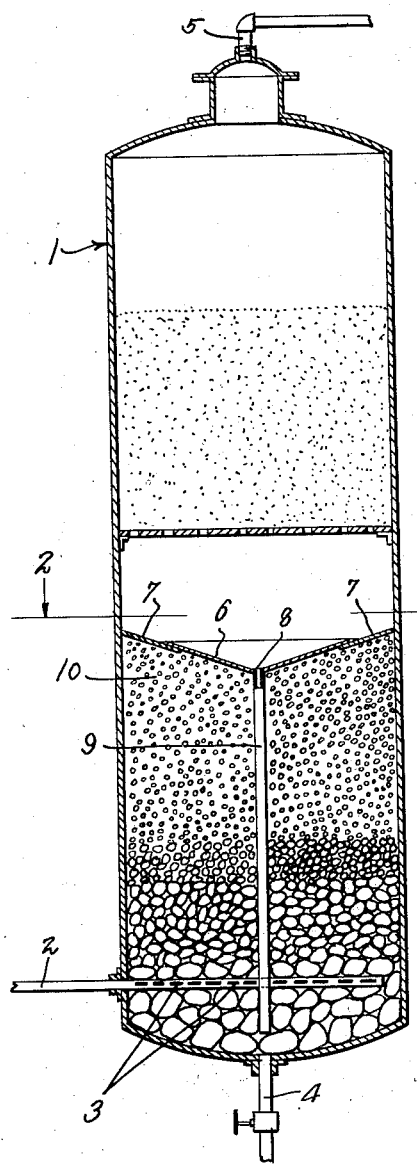
Fig. 1 is a vertical longitudinal section through a form of treating apparatus.

The form of apparatus shown in Fig. 1 consists of a vertical cylinder 1 provided with an inlet line 2 extending into the bottom portion of the treater 1, said inlet line terminating in a header or distributing ring or cross provided with a plurality of apertures 3. The bottom of the treater 1 is provided with a sludge outlet 4. The top of the treater is provided with an oil outlet 5. At a point about one-third or one-half of the height of the treater from the bottom a funnel or drip pan 6 is positioned, this funnel being of a diameter less than the internal diameter of the treater. The funnel 6 may be positioned centrally with respect to the longitudinal axis of the treater by means of arms 7 welded to the interior of the treater and to the funnel 6, the arms 7 thus positioning and supporting the funnel in the treater and leaving an annular space around the funnel to permit upward flow of oil. The apex of the funnel 6 may be provided with an aperture 8 by means of which sludge collecting in the funnel may drain downwardly. As shown in Fig. 1, a pipe 9 is connected to the port 8 of the funnel 6 and leads downwardly to below the inlet head 3.

At a suitable distance above the level of the funnel 6 a transverse grid or foraminous support 10 capable of adequately maintaining a secondary bed of material, is positioned in the treater 1. The form of the grid may vary.

The lower portion of the treater, that is, the portion between the bottom and the funnel 6, is filled with a graded bed of rock or other silicious material capable of being wetted by the sludge. The grid work 10 above the funnel 6 supports an additional graded bed of rock. A treater of the character shown in Figs. 1 and 2, 10 feet in diameter and 30 feet high, may be filled as follows:

The lower 5 feet of the treater may be filled with cobblestones from 6 to 12 inches in diameter, the larger stones being placed directly upon the bottom of the treater. This bed may then be topped with a 1 foot bed of No. 1 rock containing pieces from about 1½ to 3 inches in diameter. The third layer may consist of 7 or 8 feet of No. 2 rock ¾ to 1½ inches in diameter. This would build up a bed to a point substantially level with the upper edge of the funnel 6.

The upper bed resting on the grid may consist of a sprinkling of No. 1 rock supporting a bed 7 or 8 feet thick of No. 3 rock (¼ to about ¾ inch in diameter). The space between the funnel and the grid is 4 to 5 feet.

In operation, the acid treated petroleum distillate or other petroleum oil, together with sludge particles in suspension therein, is continuously admitted through the inlet line 2 into the treater 1. The oil and sludge rise upwardly through the voids and interstices between the rocks. During such upward movement, the sludge particles adhere to the surfaces of the rocks. As further quantities of oil are introduced into the treater, films of sludge form on the rock until a sufficient quantity of sludge is coalesced upon such surfaces as to permit downward drainage of the coagulated sludge countercurrently to the upwardly rising streams of oil and fine sludge suspended therein. In other words, downward flow of coagulated sludge and upward flow of oil and suspended sludge occur simultaneously in the bed of the treater 1.

It is to be understood that the rock or other packing material existing in the treater is of such size as to produce voids which will not allow films of sludge coalesced upon the surfaces of adjoining particles to completely fill or bridge the space therebetween. Because of the restricted size of the voids in such bed, the velocity of the upwardly moving oil in the voids of the bed is relatively high, but the flow of oil through such bed is maintained at a velocity insufficient to counteract the flow of the coagulated sludge in a direction substantially opposed to the flow of the oil.

Although the upward velocity of flow of oil through the bed is insufficient to counteract the downward movement of the large coagulated sludge particles, some small amount of sludge may be removed from the rock and carried upwardly in the form of intermediate sized sludge particles. In addition, some of the very small sludge particles are agglomerated by being brought together in the restricted voids of the bed but may not reach a size sufficient to flow downwardly against the upward flow of oil.

The oil finally reaches the annular space surrounding the funnel 6 and is discharged into the free and open space between the funnel or the top of the lower bed and the grid work 10 supporting the upper bed. This free open zone has a cross-sectional area several times that of the cross-sectional area of the plurality of voids existing in any transverse plane through the bed. As a result, the upward velocity of the oil is very greatly reduced and such oil rises but slowly in this open zone. As a consequence, the larger particles of sludge in the oil settle in this zone and upon the funnel 6. Simultaneously, by reason of such settling and by reason of the relative quiescence of the oil, coalescence of the finer droplets of sludge occurs, such coalesced droplets settling into the funnel 6.

A considerable amount of a sludge is thus removed from the oil, thereby relieving the upper bed of the treater from the burden of coalecing and separating such sludge from the oil. The sludge which settles upon the funnel or drip pan 6 is, in the embodiment shown, conveyed directly to the bottom of the treater by the line 9, thus relieving the lower bed of the burden of carrying the already coagulated and separated sludge removed from the oil during the settling operation. It is to be understood that instead of conveying this separated sludge to the bottom of the treater, the conduit 9 may lead directly to some point exteriorly of the treater, thus making it possible to separately remove or discharge the sludge which collects on the funnel or drip pan 6.

After passage through the low velocity zone, the oil, together with any remaining very fine droplets of suspended sludge, passes upwardly through the upper bed wherein the coalescence of the sludge particles upon the surfaces of the packing medium occurs in a manner similar to that described hereinabove.

The sludge coagulated in the upper portion of the bed drains downwardly through the bed and through the relatively quiescent oil in the open space between the grid and the funnel. In effect, therefore, the substantially quiescent oil in such low velocity zone is washed with coalesced sludge, which washing or scrubbing operation removes additional quantities of finely suspended sludge from the oil. The oil finally discharged through the upper outlet 5 from the treating tower 1 is sludge-free.

The process of the invention, therefore, comprises the upward passage of oil containing acid sludge in suspension through a bed of non-absorbent solid material capable of being selectively wetted by the sludge for the purpose of removing the coarser sludge particles. This is followed by a step wherein the oil, together with remaining sludge, is rendered substantially quiescent while it is being scrubbed with coagulated or coalesced sludge particles. During this settling or low velocity operation, an appreciable proportion of sludge is removed by settling and scrubbing action. The final step of the process is the coalescence of the extremely fine remaining particles of sludge by upward passage of the oil bearing the same through a second bed of non-absorbent solid material.

Figure 2:
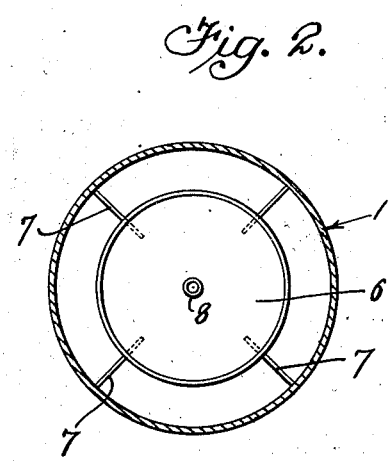
Fig. 2 is a horizontal section taken along the plane 2—2 of Fig. 1.

It is to be understood that the form of the apparatus used may vary appreciably from that shown in Figs. 1 and 2. A substantially horizontal form of apparatus is illustrated in Fig. 3. As there shown, the apparatus comprises a substantially horizontal cylindrical housing 11 provided with an inlet line 12 at one end and an outlet line 13 at the other end and in a plane above the inlet line 12. If the housing 11 is but slightly inclined, a single sludge outlet, such as the outlet 14, may be provided at the lower end and in a plane below the inlet 12. A secondary outlet for the sludge, such as the outlet 15, may be provided at the other end of the housing 11, such other outlet 15 also being in a plane below that of the inlet 12. Beds of solid material capable of being preferentially wetted by the sludge are provided in opposite ends of the treater 11. In order to retain the packing material, transverse grids or foraminous supports attached to the interior walls of the treater 11 may be provided. Such transverse grids are indicated at 16, 17 and 18. A layer of cobblestones or any large packing material may be placed along the bottom of the treater, as indicated at 20. The space between the inlet end of the apparatus and the screen or grid 16 may then be filled with a suitable packing material such as No. 2 or No. 3 rock, indicated at 21. The space between the grids 16 and 17 may then be filled with another and preferably slightly smaller packing material, indicated at 22. The space between the grids 17 and 18 is left open, whereas the space between the grid 18 and the discharge end of the housing 11 may be filled with any suitable packing material, indicated at 23.

The operation of the apparatus illustrated in Fig. 3 is substantially identical to that of apparatus shown in Figs. 1 and 2. The oil, together with its sludge suspended therein, is admitted through the line 12 and passes through the packing material 21 and 22 on which a large amount of the sludge is coagulated and permitted to drain downwardly towards the outlet 14. The oil and suspended sludge then pass into the zone between the grids 17 and 18, wherein the oil is subjected to a settling operation. During such settling, coalescence of the finer drops of sludge takes place. The settled sludge drains downwardly onto the layer of cobblestones and finally finds its way to the sludge outlet 14. The oil, together with its remaining sludge, then passes into the bed of material 23, wherein the remaining sludge is coagulated and permitted to drain downwardly towards the outlet 15. The sludge-free oil is discharged through the outlet 13.

Instead of employing large single units, the apparatus may assume a form similar to that shown in Fig. 4. As there shown, the apparatus may consist of a coagulating unit 24, a settling unit 25, and a secondary coagulator 26. These coagulators 24 and 26 may be filled with a graded packing material, such as the rock used in the apparatus shown in Fig. 1. The oil, together with its contained sludge, may be admitted to the system by means of line 27. The sludge coagulated in the coagulator 24 may be withdrawn by means of the sludge outlet 28. The partially desludged oil may then be sent by means of line 29 into the settling tank 25. Sludge may be withdrawn from this settling tank by line 30. The settled oil still containing the finely divided sludge particles in suspension, may then be conveyed as by conduit 31 to the bottom portion of the coagulator 26, wherein it is permitted to rise upwardly through the bed of packing material therein, the sludge-free oil being discharged by means of line 32. The sludge coagulated in tower 26 may be withdrawn as by means of conduit 33. If desired, the sludge withdrawn by line 33 may be pumped to the top of settling tank 25 and then sprayed downwardly through the oil contained therein for the purpose of scrubbing and gathering sludge particles suspended in such oil.

It is to be understood that numerous changes, modifications and variations may occur in the mode of operation and in the size and arrangement of the apparatus. For example, the character of the beds specifically described in the embodiment shown in Fig. 1, may be changed as to the character of the material constituting the bed (from rock to ceramic or earthenware bodies, etc.), the depth of the beds may be changed, and the size of the particles constituting each of the beds may be materially varied. Furthermore, the size of the free zone does not bear any critical relationship to the depth of the beds but instead may be of any desired size provided it is capable of reducing the velocity of flow of the oil to a point whereby settling can take place.

Apparatus of the character described hereinabove is capable of handling tremendous quantities of sludge-bearing oil in a continuous manner for prolonged periods of time. The specific unit shown in Fig. 1, for example, when packed with the materials described hereinabove, is capable of handling 50,000 gallons of acid-treated distillate per hour. The maximum practical rate of treatment is, of course, dependent upon the character of the oil, its viscosity, and the quantity of sludge carried thereby.

Before passing the acid-treated oil through the apparatus of this invention, it may be desirable to subject the acid-treated oil to a brief preliminary settling operation wherein the very coarse drops of sludge are removed. Furthermore, the porosity or void space of the beds influences the maximum throughput permissible in a given unit. Illustrative of the sludge removal obtainable by the process of this invention, in the apparatus shown in Fig. 1 the following may be cited:

Gasoline treated with 0.07 pounds of acid per gallon was passed through the apparatus at the rate of 40,000 gallons per hour. The oil admitted to the treater had an acidity equivalent to 0.00746 pounds of $H_2SO_4$ per gallon. After passing through the lower bed of the treater, the acidity had been reduced to the equivalent of 0.00187 pounds of $H_2SO_4$ per gallon. After passing through the free space and the upper bed of the treater, the discharged oil had an acidity of only 0.0011 pounds of $H_2SO_4$ per gallon, a considerable portion of which was probably due to dissolved sulfur dioxide.

All such changes and modifications as come within the scope of the appended claims are embraced thereby.

We claim:

1. An apparatus comprising a substantially vertical cylindrical housing provided with an inlet near the bottom thereof, a sludge outlet in the bottom below said inlet, and an oil outlet in the top; a bed of solid material in the bottom portion of the housing, a transverse foraminous supporting means in said housing and in spaced relation to the top of said bed, a secondary bed of solid material in the upper portion of said housing, said secondary bed being supported by the supporting means, and collecting means above said bottom bed and below said foraminous supporting means, said collecting means being spaced from the walls of the housing.

2. An apparatus comprising a substantially vertical cylindrical housing provided with an inlet near the bottom thereof, a sludge outlet in the bottom below said inlet, and an oil outlet in the top; a bed of solid material in the bottom portion of the housing, a transverse foraminous supporting means in said housing and in spaced relation to the top of said bed, a secondary bed of solid material in the upper portion of said housing, said secondary bed being supported by the supporting means, collecting means above said bottom bed and below said foraminous supporting means, said collecting means being spaced from the walls of the housing, and a conduit leading from said collecting means through said bottom bed of material to a point below said inlet.

3. An apparatus comprising a substantially vertical cylindrical housing provided with an inlet near the bottom thereof, a sludge outlet in the bottom below said inlet, and an oil outlet in the top; a bed of solid material in the bottom portion of the housing, a transverse foraminous supporting means in said housing and in spaced relation to the top of said bed, a secondary bed of solid material in the upper portion of said housing, said secondary bed being supported by the supporting means, collecting means above said bottom bed and below said foraminous supporting means, said collecting means being spaced from the walls of the housing, and a conduit leading from said collecting means to a point exteriorly of said housing.

AUGUSTUS W. GLEASON.
DONALD B. NUTT.